Patented Jan. 7, 1930

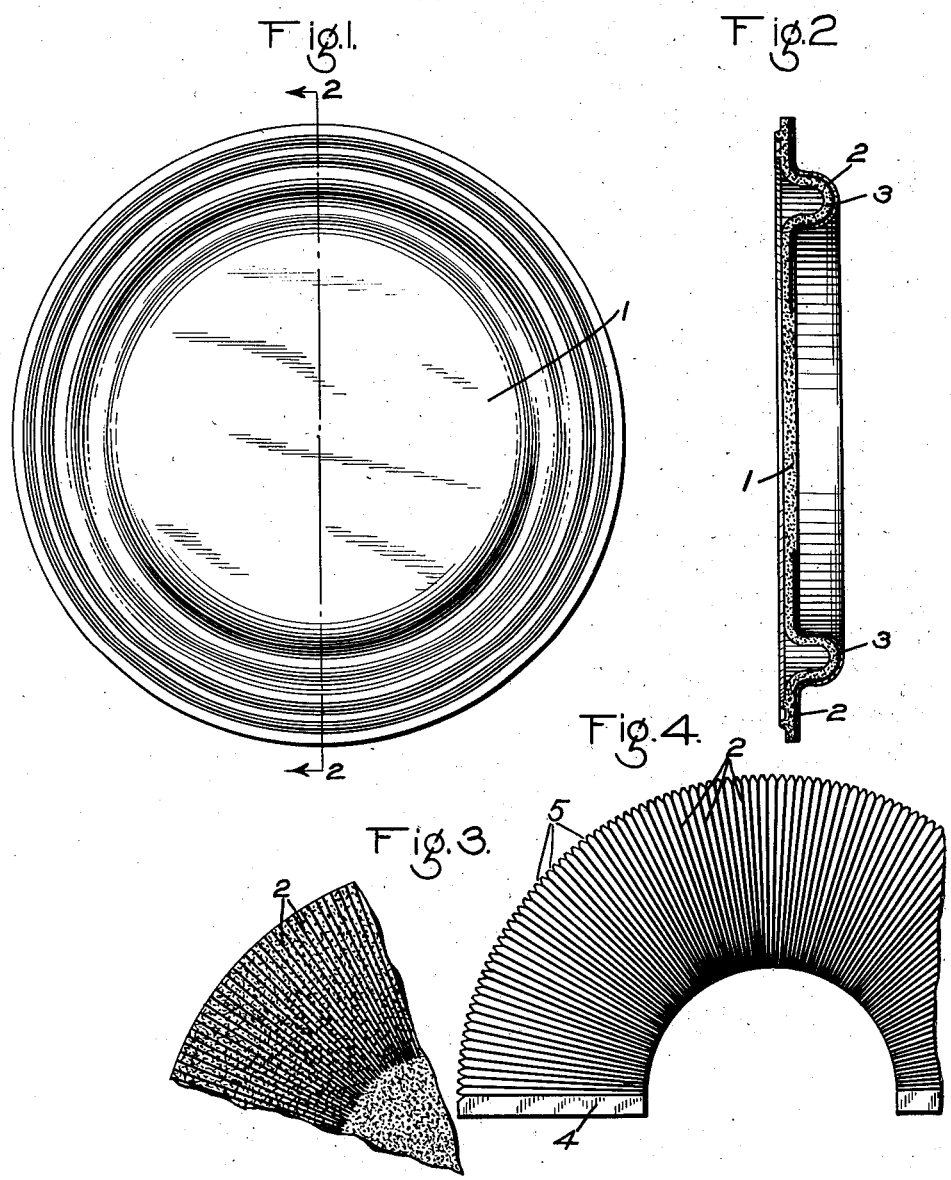

1,742,398

UNITED STATES PATENT OFFICE

CECIL S. KELLEY, OF EAST McKEESPORT, PENNSYLVANIA, ASSIGNOR TO THE WESTINGHOUSE AIR BRAKE COMPANY, OF WILMERDING, PENNSYLVANIA, A CORPORATION OF PENNSYLVANIA

PROCESS OF MAKING FLEXIBLE DIAPHRAGMS

Application filed November 7, 1925. Serial No. 67,615.

This invention relates to flexible diaphragms of the type adapted to be clamped at the outer edge and which is flexed in service to accomplish various purposes.

The principal object of my invention is to provide an improved flexible diaphragm which is very sensitive to slight variations in pressure thereon and yet has the strength to withstand continual flexing for a long period of time, without danger of rupture or breaking.

In the accompanying drawing; Fig. 1 is a plan view of a flexible diaphragm constructed in accordance with my invention; Fig. 2 a section on the line 2—2 of Fig. 1; Fig. 3 a section of a portion of the sheet from which the diaphragm is formed, showing the manner in which the reinforcing cords are disposed; and Fig. 4 a plan view of a reinforcing cord holding form, employed in the process of making the diaphragm.

According to my invention, the diaphragm 1, as shown in the drawing, comprises a disk of rubber composition, having reinforcing cords 2 which are disposed radially and are embedded in the rubber composition.

The diaphragm shown in the drawing is provided near its periphery with an annular U-shaped fold 3, and the flexing of the diaphragm takes place at the fold, so that the reinforcing cords 2 need not extend to the center of the diaphragm, but only somewhat beyond the fold, as shown in Fig. 2.

In the process of making the diaphragm, a metal semi-annulus form 4 is employed, having the periphery provided with evenly spaced notches 5. The reinforcing cord 2 is wound on the semi-annulus, so that the cord engages in the notches 5, as shown in Fig. 4. A corresponding semi-disk of rubber composition is then applied to each of the opposite sides of the metal-semi-annulus and the whole is then subjected to pressure, so that the cord is pressed into the rubber composition.

At the periphery, the rubber composition is trimmed close to the notched edge of the metal semi-annulus and the rubber composition with the embedded cord is then stripped from the metal semi-disk, after the cord 2 has been severed by inserting a knife under the cord and cutting same both at the outer end and at the inner periphery of the metal form.

After stripping from the form, the two semi-disks with the embedded cord are joined together to form a complete diaphragm disk, and preferably an additional rubber composition disk is cemented to that face of the disk, which is opposite the corded face.

The diaphragm disk so formed is then placed in a two part mold, one part of which is provided with an annular U-shaped rib and the other part with a corresponding depression, so that when the mold sections are subjected to pressure, the diaphragm will be shaped with the U-shaped fold near the outer periphery, as shown in Fig. 2. The diaphragm is then vulcanized while in the mold to provide a finished diaphragm.

By disposing the reinforcing cords radially only, the flexibility of the diaphragm is not impaired, and at the same time, the diaphragm is strengthened to prevent rupture of the diaphragm when the same is flexed.

The flexing of the diaphragm is in such a direction, that the radially disposed cords resist stresses set up in the diaphragm when the diaphragm is flexed.

The provision of the U-shaped fold in the diaphragm makes the diaphragm very sensitive or responsive to changes in pressure on the diaphragm and the radial cord reinforcement strengthens the diaphragm to withstand continual flexing for a long time without rupture or breaking, and at the same time, the cords, being radially disposed, do not reduce the flexibility of the diaphragm.

Having now described my invention, what I claim as new and desire to secure by Letters Patent, is:—

1. The process of fabricating material for use in making a flexible daphragm having radially disposed reinforcing cords, which consists in winding a cord on a semi-annular form so that the windings are disposed radially, pressing a section of rubber composition material against a face of the form, so that the cord is embedded in the rubber composition, severing the cord at the inner and outer peripheries of the form, and in then stripping the rubber composition with the embedded cord from the form.

2. The process of fabricating material for use in making a flexible diaphragm having radially disposed reinforcing cords, which consists in winding a cord on a semi-annular form, so that the windings are disposed radially, pressing a section of rubber composition material against each of the opposite faces of said form, so that the cord is embedded in the rubber composition, severing the cord at the inner and outer peripheries of the form, and in then stripping the rubber composition sections from the form, with the cord embedded therein.

3. The process of making a flexible diaphragm having radially disposed reinforcing cords, which consists in winding a cord on a semi-annular form, so that the windings are disposed radially, pressing a section of rubber composition material against each of the opposite faces of said form, so that the cord is embedded in the rubber composition, severing the cord at the inner and outer peripheries of the form, in then stripping the rubber composition sections from the form, with the cord embedded therein, and then joining the two sections to form a complete disk.

4. The process of making a flexible diaphragm having radially disposed reinforcing cords, which consists in winding a cord on a semi-annular form, so that the windings are disposed radially, pressing a semi-disk of rubber composition material on each of the opposite faces of said form, so that the cord is embedded in the rubber composition, severing the cord at the inner and outer peripheries of the form, in then stripping the semi-disks from the form, and then joining the two semi-disks to form a complete disk.

5. The process of making a flexible diaphragm, which consists in winding a cord on a semi-annular form, so that the windings are radially disposed, in pressing a semi-disk of rubber composition material on each of the opposite faces of said form, so that the cord is embedded in the rubber composition, in severing the cord at the inner and outer peripheries of the form, in stripping the semi-disks from the form, in joining the two semi-disks to form a complete disk, in placing the disk so formed in a mold to form an annular U-shaped fold near the periphery of the disk, and in then vulcanizing the disk in the mold.

6. The process of fabricating material for use in the manufacture of flexible diaphragms, which consists in winding a reinforcing cord on an arcuate form, with the strands disposed radially and side by side without overlapping, in then applying a section of rubber composition to the face of the form, and in then removing the material from the form.

7. The process of fabricating material for use in the manufacture of flexible diaphragms which consists in winding a reinforcing cord on a semi-annular form with the cord disposed in radial and non-overlapping strands, in then pressing a section of rubber composition against the face of the form, and in then removing the material from the form.

In testimony whereof I have hereunto set my hand.

CECIL S. KELLEY.